United States Patent Office 3,515,682
Patented June 2, 1970

3,515,682
CRACKING CATALYST MANUFACTURE
William H. Flank, Broomall, and James E. McEvoy, Springfield, Pa., and George Alexander Mills, Bethesda, Md., assignors to Air Products and Chemicals, Inc., Philadelphia, Pa., a corporation of Delaware
No Drawing. Continuation-in-part of applications Ser. No. 540,201, Apr. 5, 1966, and Ser. No. 574,306, Aug. 23, 1966. This application Dec. 6, 1968, Ser. No. 781,951
Int. Cl. B01j *11/58*
U.S. Cl. 252—455                                11 Claims

ABSTRACT OF THE DISCLOSURE

Calcination of a mineral such as perlite, halloysite and/or kaolin yields a dehydrated aluminosilicate which, if it passes a leaching test, can be transformed to impure sodium faujasite by two stage alkaline aging. Interstage addition of water or aqueous modifier is optional. Ammonium exchange yields cracking catalysts.

CROSS-REFERENCE

This application is a merger of a grandparent application and a parent application which was a continuation-in-part of the grandparent case. Reference is made to each of Ser. No. 540,201 filed Apr. 5, 1966, now abandoned, and Ser. No. 574,306 filed Aug. 23, 1966, now abandoned, all the details of which are deemed here reiterated.

BACKGROUND

Heretofore hydrocarbons have been cracked by treatment at elevated temperature over porous, high-surface area structures consisting essentially of a mixture of oxides. For many years amorphous zeolites were ion-exchanged to the ammonium zeolite form, and thereafter calcined to provide hydrogen zeolite, that is, acidic cracking catalysts having an ion-exchange capacity significantly less than that of the ammonium zeolite precursor. Subsequently advantages were found for cracking catalysts comprising a crystalline ammonium zeolite and/or its calcination products. Much of the literature relating to cracking catalysts comprising crystalline zeolites features the use of pure chemicals as the starting material for the crystalline component. Important advantages are achieved by using a mineral as the starting material instead of pure chemicals. This invention is concerned with the manufacture of cracking catalysts starting with aluminosilicate minerals.

In recent years, cracking catalysts comprising synthetic faujasite have aroused interest. Natural faujasite is a naturally occurring crystalline zeolite having relatively large unit cells of the general magnitude of 25 angstroms interconnected with relatively large pores of the general magnitude of 13 angstroms diameter. The term "faujasite" embraces not only natural faujasite but also all synthetic materials having enough resemblance to the crystalline structure of natural faujasite to feature the relatively large pores and sorptive qualities of this general family of large pore crystalline materials.

Although neither silica nor alumina exists as such within a unit cell of faujasite, it is convenient to refer to the unit mol ratio of silica to alumina of various types of faujasite. Silica to alumina mol ratios from about 2 to 14 have been contemplated for synthetic faujasites. Naturally occurring faujasite generally has a silica to alumina mol ratio from about 4:1 to about 6:1, but is quite rare. The mol ratio of silica to alumina in faujasite is generally expressed as a unit mol ratio so that the one mol of alumina is implied.

In pure samples of sodium faujasite, silica to alumina mol ratios can be measured by several methods including ion-exchange capacity, chemical analysis, and X-ray diffraction. The data for a series of pure sodium faujasites of different silica to alumina ratios can be tabulated to provide reference data useful in estimating the different ratios of silica to alumina for a series of samples comprising sodium faujasite in an aluminosilicate matrix where the sodium faujasite has been prepared by a method resembling that employed for a reference standard. Analysis of X-ray data for a sample in comparison with reliable reference data permits determination of the silica to alumina unit mol ratio in the sodium faujasite component of the sample.

The X-ray diffraction properties of a material must be sufficiently similar to that of natural faujasite to evidence some similarity of structure in order for the term faujasite to be applied. However, the X-ray diffraction data on the many varieties of synthetic faujasite differ enough to permit recognition of varieties of faujasite which differ as to distribution among cations (sodium, magnetium, calcium, hydrogen, ammonium, etc.), differ as to silica to alumina mol ratio, differ as to mode of preparation, etc. The careful analysis of X-ray diffraction data for different samples of faujasite can be oriented to emphasize either the differences or the similarities. Any analysis of X-ray diffraction data is dependent in part upon the availability of a series of reference samples prepared by a comparable procedure and upon the preciseness of other analytical data (ion-exchange capacity, elemental analysis, etc.) concerning the reference samples.

Ammonium zeolites, when heated above 250° C. evolve ammonia, and are converted into products which can be described as mixtures of hydrogen zeolite and decationized zeolite but which are conveniently designated merely as hydrogen zeolites. The ion-exchange capacity of a heat-treated (e.g., substantially dehydrated) ammonium zeolite sample generally has been significantly (e.g., 45 to about 98%) less than the ion-exchange capacity of the raw ammonium zeolite, thus indicating that decationization is an inherent feature of calcination of an ammonium zeolite. The presence of any measurable acidity in the product from heating an ammonium zeolite has been recognized as more important than whatever temporary decationization or permanent decationization has occurred. Hence, such products have generally been designated as hydrogen zeolites, notwithstanding the possibility of also describing such products as a mixture of decationized zeolite and hydrogen zeolite. For many years, it has been the standard practice to prepare cracking catalysts comprising hydrogen zeolite in a matrix by the heating of a matrix containing an ammonium zeolite. For example, Bates 2,283,173 describes such a procedure.

Cracking catalysts derived from the hydrated aluminum disilicates in accordance with certain embodiments herein comprise hydrogen faujasite having a silica to alumina unit mol ratio closely resembling the ratios encountered in natural faujasite, that is, a unit mol ratio of silica to alumina in the range from about 3.5 to 6:1.

Loss of ion-exchange capacity of a hydrogen zeolite may in some instances involve a loss of an oxygen atom from the zeolitic aluminosilicate framework so that the relative number of oxygen atoms is less than in a sodium zeolite from which it might have been derived. Attempts at designating formulas for decationized hydrogen zeolites resemble formulas for acid anhydrides, but most decationized hydrogen zeolites differ from conventional acid anhydrides, not merely as regards ease of rehydration to restore acid activity, but also as to most chemical and physical properties. A sodium faujasite having a silica to alumina mol ratio of 6 to 1, converted by silver exchange and then ammonium-exchange to high purity ammonium faujasite, might be designated as

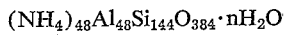
$(NH_4)_{48}Al_{48}Si_{144}O_{384} \cdot nH_2O$

After calcination, its formula might be designated as $H_2Al_{48}Si_{144}O_{361}$, indicating a loss of 96% of ion-exchange capacity.

When a crystalline hydrate such as copper sulfate or calcium sulfate is thermally dehydrated, some evidence of stepwise reactions and a plurality of stoichiometric compositions can be detected. The reactions occurring during the heat treatment of zeolites (including faujasites) do not follow such stepwise patterns, but instead seem to follow patterns of gradual transition. Decationization and formation of sites resistant to rehydration at some portions of the faujasite structure might conceivably occur at temperatures lower than required for removing sorbed water from other portions of the same samples of ammonium faujasite. Thus, partial decationization may accompany partial drying of a sample of ammonium faujasite. A family of materials is embraced within a designation such as hydrogen faujasite, so that the presence of ammonium, sodium, or related cations is not excluded if acid activity of hydrogen faujasite nature is readily measured and if X-ray diffraction data provide evidence that the sample was derived from a material containing faujasite.

Tests for evaluating the expected commercial activity and stability of a cracking catalyst ordinarily utilize a form of accelerated aging such as treatment of a series of samples of the catalyst for a standard period (e.g., 4 hours) at a series of elevated temperatures in the presence of 100% steam, whereby a general temperature range is found in which subsequent measurement of the activity of the catalyst exhibits a marked decline. It is thus possible by selection of one or more artificial aging conditions to compare relative stability levels of various types of catalysts. Such temperature is generally more than 100° C. lower than the stability limit measured by brief treatment with hot dry air. The need for withstanding high temperatures is attributable to high temperatures encountered in the coke-burning step of the regeneration operation, not the step of cracking hydrocarbons. The temperature at which some cracking can be conducted is well below that at which rapid thermal deactivation of hydrogen faujasite occurs. The temperatures encountered in conventional regeneration of cracking catalysts tend to cause at least some gradual deactivation of many varieties of hydrogen faujasite.

Heretofore there have been proposals for the production of sodium faujasite as a molecular sieve by a plurality of steps comprising at least one step of aging a composition at alkaline pH. It has been previously proposed that meta kaolin, prepared by the calcination of kaolin at a temperature such as from about 500 to 850° C., be utilized as a source of a portion of the composition subjected to alkaline aging. According to several procedures for making intermediate products comprising sodium faujasite, the composition was substantially the same in each of the plurality of stages of aging, for example, cold-aging at a temperature below about 50° C. and subsequent hot-aging at a temperature between about 55° C. and 120° C. A product designated as sodium faujasite in an aluminosilicate framework can be prepared by multi-stage aging of an alkaline composition comprising calcinated kaolin, but there is only an incomplete understanding of the reaction mechanisms or nature of the chemical transformations.

SUMMARY

In certain embodiments of the invention, an aluminosilicate cracking catalyst is prepared by a process comprising aging a calcined reactive aluminosilicate material in an aqueous system comprising alkaline components imparting a high pH to the system. In certain embodiments, special attention is directed to reliance upon a particular alkaline leaching test both for selecting a naturally occurring hydrated aluminosilicate mineral and for selecting the calcination conditions for calcining such hydrated mineral to prepare a "reactive" aluminosilicate material. After hot-aging at high pH, a step of ammonium ion-exchange is conducted. The active cracking catalyst results after heating to obtain evolution of ammonia from ammonium-exchanged particles, but this heat-stabilization step can occur, for example, at the catalyst factory or in the regenerator at a petroleum refinery. The alkaline leaching test is useful for regulating the mineral selection and selection of mineral calcination conditions, whatever choice is made concerning particle formation. Particles can be shaped before or after calcination or before or after alkaline aging, but are desirably shaped prior to the ammonium ion-exchange step. The particles can be shaped into cylinders or spheroids or other suitable form for use in fluidized bed, gravitating bed, fixed bed, or other catalyst zone.

The particular alkaline leaching test can be helpful in screening many hydrated aluminosilicate minerals, most of which must be rejected. The alkaline leaching test has usefulness as a manufacturing control procedure for detecting off-grade material. The alkaline leaching test is especially useful because it permits the selection of the product from calcination at particular conditions of a particular hydrated aluminosilicate mineral, but this pragmatic result is deemed to flow from a two-step selection consisting of an initial step of selecting a mineral and a step of selecting calcination conditions. Some hydrated aluminosilicate minerals are rejected by reason of their chemical composition.

The naturally occurring hydrated aluminosilicate mineral which is selected as the raw material must have a weight of silica greater than the weight of alumina. Expressed as a unit mol ratio, the silica to alumina unit mol ratio in the mineral must be greater than about 1.7. The total of combined $SiO_2$ and $Al_2O_3$ is greater than the total of all other metal oxides and this predominance is designated by the term aluminosilicate. Analysis of the mineral may show the presence of alkali and alkaline earth metals, usually reported as oxides, such as sodium, potassium, calcium and/or magnesium. Other metals, usually reported as oxides, such as titanium, iron or the like also may be present. In the acceptable mineral the ratio, excluding silicon atoms, of aluminum atoms to each of such alkaline earth metal atoms is at least 10:1, and to each of the other metal atoms, exclusive of the alkali and alkaline earth metal atoms, should be greater than about 20:1. In particular the iron content of the mineral must be relatively small so that the ratio of aluminum atoms to iron atoms in the mineral is greater than 30:1. The mineral must contain water which is not removed by heating at a normal drying temperature and such mineral is hence designated as a hydrated mineral.

The hydrated aluminosolicate is calcined at a temperature below the sintering temperature but at a temperature significantly hotter than required to remove most of the hydrate water. If the calcination temperature is severe enough to sinter the aluminosilicate into a low surface area product, then the aluminosilicate will not pass the alkaline leaching test. Certain embodiments of the invention are concerned especially with a particular test, designated as an "alkaline leaching test," by which the combination of satisfactory reactive aluminosilicate material and satisfactory calcination conditions are distinguished from the ineffective materials and/or ineffective calcination conditions. Thus, the alkaline leaching test is suitable for use as the control for regulating the severity of the calcination and for determining whether a particular mineral is susceptible to conversion into a "reactive" aluminosilicate material at any of the several conceivable calcination conditions.

The alkaline leaching test particularly emphasized in certain embodiments of the present invention requires the treatment of a pulverized sample of a calcined mineral with six times its weight of a 5 molar solution of aqueous sodium hydroxide at about ambient temperature for a period of 48 hours. The solution resulting from such alkaline leaching is analyzed and the sample is designated as a properly calcined reactive aluminosilicate material only if the unit mol ratio of dissolved silica to dissolved alumina is greater than 5 but less than 25 and only if the dissolved silica and alumina indicate that at least 10% of the sample is dissolved during the alkaline leaching test. Colloidal particles suspended in the aqueous system are deemed to be dissolved, thus distinguishing from the particles remaining as precipitates at the bottom of the system from which supernatant liquid might be decanted.

Although particular attention is directed to the suitability of the alkaline leaching test for controlling both the selection of the mineral and the regulation of the conditions of calcination thereof, it should be noted that cracking catalyst particles are manufactured from the properly calcined aluminosilicate material. The properly calcined aluminosilicate is subjected to alkaline aging at about ambient temperature and then at about the boiling point of water. Subsequent to the hot-aging in the presence of an aqueous solution having a high pH, an ammonium-exchange step substitutes ammonium ions for a significant portion of the cations of the metals of the alkaline hydroxides employed in the high pH aging solution. Products having catalytic cracking activity are obtained by heating particles under conditions at which ammonia and water are evolved from the ammonium-exchanged particles.

In accordance with the invention defined in certain claims, a cracking catalyst comprising hydrogen faujasite in an aluminosilicate matrix is prepared by a procedure having several steps. A catalytic grade of a hydrated aluminum disilicate is calcined at a temperature within the range from about 965° C. to about 1095° C., preferably in the range of 1010° C. to 1050° C., to produce a reactive aluminum disilicate. Particles of calcined reactive aluminum disilicate are dispersed in aqueous alkaline hydroxide forming an alkaline slurry having a weight ratio of calcined aluminum disilicate to sodium hydroxide equivalent within the range from about 4:1 to about 6:1, and a weight ratio of water to sodium hydroxide equivalent within the range from about 4:1 to about 10:1. If at least one of lithium hydroxide, magnesium hydroxide, potassium hydroxide, lower alkyl (e.g., methyl) quaternary ammonium hydroxide, and calcium hydroxide is substituted for a portion of the sodium hydroxide, then the substituted stoichiometric equivalent to sodium hydroxide is a part of the "sodium hydroxide equivalent" weight employed in weight ratio formulation control. Inasmuch as the alkaline slurry generally contains sufficient sodium that the faujasite product comprises sodium faujasite, it is convenient to designate the faujasite component of the hot-aged product as sodium faujasite without regard to the presence or absence of other zeolitically held cations such as tetramethylammonium, calcium, magnesium, potassium and lithium cations. Natural zeolites are sometimes designated by reference to a readily identified cation notwithstanding the possible presence of other cations.

The slurry of aqueous alkaline aluminum disilicate is maintained (aged) during a period of from about 5 hours to about 5 days at a temperature in the range from about 10 to 50°C. The aged slurry is heated to a temperature in the range from 80 to 120° C., and maintained within said temperature range during a hot aging period of from about 5 hours to about 5 days to provide a hot-aged composition. The resulting slurry is characterized by the presence of a measurable amount of sodium faujasite having a silica to alumina unit mol ratio greater than 3.5 but less than 6, such sodium faujasite being in an aluminosilicate matrix.

This slurry of synthetic faujasite in an aluminosilicate matrix is subjected to a grinding operation to provide a composition in which the mean particle size is less than 10 microns and desirably less than about 1 micron. Sometimes before, but ordinarily after such grinding, a suitable material, referred to as binder, is added to the composition to effect or augment the binding together of the solid components from the hot-aged slurry. The binder is so selected as to preserve the aluminosilicate nature of the matrix. The amount of binder employed is from 0 to 45% and often 5% to about 40% of the weight of the dehydrated aluminum disilicate. In any event, the comminuted solids of the hot-aged composition are the predominant portion of any mixture with binder. The highly advantageous composition of the comminuted solids of the hot-aged slurry consists of 5 to 80% sodium faujasite in an aluminosilicate matrix, the sodium faujasite having a silica to alumina unit mol ratio within the range from 3.5 to 6. Although such composition has particular usefulness as an intermediate in the manufacture of cracking catalyst, certain embodiments of the invention are concerned with the combination of slurry aging and comminuting the hot-aged slurry, regardless of the end use for the highly advantageous composition.

The composition featuring the comminuted, hot-aged slurry is shaped to provide convenient particles. For example, the mixture can be spray dried to shape it into fluidizable particles. Beads having a diameter of about 4 mm. can be prepared from the comminuted, hot-aged slurry. The moisture content of the slurry can be adjusted to provide an extrudable plastic composition which can be extruded as strands and sliced into pellets. Various shapes of particles may be formed by any of the many effective procedures.

The thus-shaped particles comprising sodium faujasite in an aluminosilicate matrix are treated with an aqueous solution of an ammonium salt to prepare particles comprising ammonium faujasite in an aluminosilicate carrier. Ordinarily the ammonium exchange is not absolutely complete. However, the residual content of alkaline materials such as magnesium, calcium, lithium, potassium, and sodium, when calculated on a sodium oxide equivalent basis, is generally less than 2% of the anhydrous weight of the ion-exchanged particles. The ammonium faujasite content of the particles is generally within the range corresponding to from about 5% to about 80% of the anhydrous weight of the ion-exchanged particles. The $SiO_2/Al_2O_3$ unit mol ratio of the ammonium faujasite is in the range from about 3.5 to about 6.

Particles suitable for use as cracking catalyst in a petroleum refinery are prepared by subjecting the particles comprising such ammonium faujasite to a suitable step of heating or drying whereby some of the ammonia is evolved. Cracking catalyst particles designed for use in a gravitating bed are generally subjected to a stabilizing treatment, such as steaming at about 775° C. for several hours prior to shipment to the refinery. Fluidized catalyst particles can be stabilized in the regenerator portion of the cracking catalyst unit, and accordingly can be shipped from the catalyst factory after drying and without the separate stabilization treatment.

In certain embodiments of the invention, a crystalline faujasite material is included in the composition subjected to alkaline aging, whereby cold-aging is optional, and hot-aging can be conducted in a range from 55° C. to 120° C. In such embodiments, a mineral selected from the group consisting of kaolin, halloysite, and mixtures thereof must be calcined at a temperature in the range of 965° C. to 1095° C. and preferably within the range of from 1010° C. to 1050° C. The ammonium faujasite content of the ion-exchanged precursor of cracking catalyst particles must be from 5% to 80%.

In certain embodiments of the invention, both cold-aging and hot-aging at alkaline conditions are conducted, but the composition of the reactive system is modified so that at the end of the hot-aging the amount of components employed differs from the amount of components employed at the end of the cold-aging. Illustrative embodiments of such alteration of the components subsequent to aging at a temperature below about 50° C. and prior to the end of the hot-aging at a temperature below 120° C. include the addition of water during hot-aging to alter the water to sodium hydroxide ratio or the addition of aqueous sodium hydroxide to alter the calcined aluminum disilicate to sodium hydroxide equivalent ratio. Other changes in ingredients include other aqueous modifiers. Such procedures require the use of the 965–1095° C. range for calcination of the kaolin, halloysite, or mixtures thereof, for the production of particles having 5% to 80% crystalline faujasite which has a unit mol ratio of silica to alumina from 3.5 to 6.

In accordance with certain embodiments of the present invention, the composition is modified subsequent to the cold-aging, but prior to the completion of the hot-aging. There is thus prepared a product comprising sodium faujasite useful in the manufacture of cracking catalyst particles.

DETAILED DESCRIPTION

The nature of the invention is further clarified by reference to a plurality of examples.

Examples 1–8

The alkaline leaching test (sixfold weight of 5 molar sodium hydroxide, 48 hours, dissolved $SiO_2/Al_2O_3$ unit mol ratio from 5 to 25, dissolved $SiO_2+Al_2O_3$ more than 10% of sample) was employed in selecting the perlite and in selecting the calcination conditions for preparing the properly calcined aluminosilicate material. The expanded perlite which passed said test was prepared by dropping pulverized volcanic glass into a hot gaseous zone maintained at about 1100° C. In a series of catalyst preparations, a slurry was made consisting of 1 part by weight of sodium hydroxide, from 1.25 to 3 parts by weight of said properly calcined perlite, and from 5 to 9 parts of water, as shown in Table 1. The thus prepared slurry was maintained quiescently at about 40° C. for about 54 hours and then maintained quiescently at about 95° C. for about 24 hours to produce hot-aged slurry. The hot-aged alkaline slurry of properly calcined perlite is treated with ammonium nitrate to provide an ammonium-exchanged composition, which is mixed with a quantity of halloysite binder equal to the weight of perlite, and shaped into granular pellets and heat stabilized to provide active cracking catalyst pellets.

In each catalyst preparation procedure, the ammonium ion-exchange step is conducted by the use of an aqueous solution of ammonium salt containing ammonium ion which is from about 2 to about 10 times the stoichiometric equivalent of the alkaline cation to be removed. The ion-exchange step is desirably conducted at about 80–110° C., permitting sufficient contact time to assure diffusion of the aqueous ammonium salt into the interior of the particles. Granular particles generally require longer periods for ion-exchange than fluidizable particles inasmuch as solution readily diffuses to the interior of the fluidizable particles which have diameters within the range from about 15 to about 150 microns. The concentration of ammonium ion in the exchanging solution is generally from about 1 to about 13%, corresponding to ammonium salt concentrations of up to about 50%. It is generally convenient to employ from about 3 to about 10 theoretical (or actual) stages of ion-exchange, inasmuch as a relatively small residual alkali content is achieved by providing a large ratio of ammonium ion to sodium ion in the feed to each stage of ion-exchange, so that the effluent from the final stage has a large ratio of ammonium ion to sodium ion.

Gas oil is cracked to gasoline at a temperature above that at which substantially all of the ammonia is evolved from ammonium-form particles of cracking catalyst. Stabilization of the cracking catalyst is achieved by subjecting the particles to a temperature higher than that of the cracking zone. Hence, catalyst particles are conventionally stabilized by some heat treatment. Fluidizable particles from a catalyst factory are sometimes introduced into a regenerator and stabilized at the elevated temperature prevailing in the regenerator (e.g., about 650° C.). Granular catalyst is sometimes subjected to an atmosphere containing steam at about 730° C. for several hours to stabilize its activity. A stabilized sample is employed during the testing and rating of a cracking catalyst.

Cracking catalysts can be rated according to designations such as excellent, superior, good, average (that is, within the range of performance of cracking catalyst employed commercially in recent decades), poor (inferior to said range of performance of catalysts employed commercially) and very poor.

As shown in Table 1, several preparations were conducted using such expanded perlite as follows:

TABLE 1

| Example | Weight ratio in dispersion | | | Rating |
|---|---|---|---|---|
| | Perlite | NaOH | $H_2O$ | |
| 1 | 1.72 | 1 | 7.58 | Excellent. |
| 2 | 2.38 | 1 | 7.60 | Superior. |
| 3 | 1.72 | 1 | 6.72 | Do. |
| 4 | 1.72 | 1 | 6.03 | Good. |
| 5 | 1.72 | 1 | 5.52 | Do. |
| 6 | 1.29 | 1 | 5.57 | Do. |
| 7 | 2.38 | 1 | 8.48 | Average. |
| 8 | 2.58 | 1 | 6.72 | Do. |

A preparation, similar to Example 6, above, except that appreciably less water was employed in the formulation, gave a product that was rated poor to very poor.

A suitable cracking catalyst can be prepared from said perlite using about 1.5 to 3 weights of said properly calcined perlite per weight of sodium hydroxide, and from about 5 to about 9 parts of water per weight of sodium hydroxide during the critical alkaline aging steps.

Example 9

A large batch of cracking catalyst was prepared using the same kind of expanded perlite in an aqueous alkaline solution at the same proportions of Example 3. This composition was prepared by dissolving 2.89 kg. of sodium hydroxide in 19.5 liters of distilled water and dispersing in this alkaline mixture 5 kg. of the expanded perlite shown to pass said alkaline leaching test. The thus prepared dispersion was aged quiescently for 60 hours at a temperature of 40° C., and then heated to about 95° C., and aged quiescently at the elevated temperature for 48 hours.

The thus hot-aged slurry was mixed with 5 kg. of kaolin and wet milled in a ball mill for several hours to provide an aqueous slurry comprising small particles. The resulting aqueous slurry of small particle size material was mixed with sodium silicate solution containing 2.8 kg. of silica, which composition was spray dried at a nozzle pressure of about 4 kg. per square cm. and at an inlet temperature of about 430° C. The product from the spray dryer contained 3% water removable at about 105° C., thus indicating that the drying conditions during the spray drying were not optimum.

The spray dried particles were ion-exchanged with an aqueous solution of ammonium nitrate until the residual content of potassium oxide and sodium oxide was less than 2%. The ammonium-form particles were pelleted by compression. The pellets were heated in the presence of steam at 730° C. for 4 hours to stabilize the cracking activity thereof. The steam-stabilized pellets were partially crushed to provide granules having surfaces not unduly resistant to the diffusion of hydrocarbon vapors. Some cracking catalysts containing moderately small amounts of iron are adversely affected by sulfur present during the cracking reaction, producing less gasoline and more coke. In order to determine the sensitivity of the cracking catalyst to gas oils containing sulfur contaminants, one portion of the steam-treated catalyst was further heat-treated with a mixture of 75% $N_2$ and 25% $H_2S$ at 650° C. for 2 hours. The two heat-treated catalysts and a commercial kaolin cracking catalyst given a similar sulfiding treatment were evaluated by a standard procedure for measuring cracking catalyst activity by noting the results of cracking a standard gas oil over such catalysts. The standard test is described in an article by C. G. Harriz, Hydrocarbon Processing, October, 1966 and is also digested in a section designated as "Catalyst Evaluation Procedure" in an application of Cornelius et al. Ser. No. 364,104 filed Feb. 20, 1964. The results observed were as follows:

| Catalyst | Vol. percent gasoline | Wt. percent coke | Wt. percent gas | Gas grav. | Wt. percent conv. | Wt. percent select. |
|---|---|---|---|---|---|---|
| Steamed | 38.3 | 1.0 | 9.6 | 1.28 | 44 | 76 |
| Sulfided | 37.4 | 1.3 | 10.3 | 1.17 | 45 | 74 |
| Commercial sulfided | 34.0 | 4.0 | 17.4 | 1.30 | 51 | 58 |

The catalyst derived from perlite by the cold and hot-aging steps, even when diluted considerably with the relatively inert kaolin and silicate, proved to be superior in both heat treated forms to some cracking catalysts which have been commercially employed in recent decades.

Example 10

A cylindrical drum having a diameter of about 17 cm. and a length of about 2 meters was rotatably mounted so that the powder could be tumbled during calcination. About half of the length of the drum served as a gas-heated calcination zone, followed by a zone for cooling the calcined product prior to discharge from the drum. A gas flame heated the annular zone around the rotating drum and there was an insulating shell directing the heat toward the interior of the drum at such calcination zone. Thermocouples were positioned near the edge of the flame zone and near the middle of the axis of the drum in the calcination zone. This apparatus was employed for the calcination of the raw material described below.

Halloysite is a hydrated aluminum disilicate meeting the described silica and aluminum requirements. A commercially available halloysite was found on analysis to have an iron content less than about 0.1% $Fe_2O_3$, thus providing a ratio of aluminum atoms to iron atoms greater than 30:1. The impurities such as titania, calcium oxide, etc. were low enough to provide ratios of aluminum atom to each other metal atom several times greater than 20:1. Such halloysite is calcined at 400° C. for 2 hours, thereby removing some of the hydrate water from the material. The calcined halloysite fails to pass the described leaching test, inasmuch as the ratio of the desilica to dissolved alumina is substantially 2.

Another sample of the halloysite is calcined at 965° C. for 2 hours and the product is tested by the described alkaline leaching test. A sample of the cooled halloysite calcined at 965° C. is subjected to alkaline leaching by six times its weight of a 5 molar solution of sodium hydroxide for 48 hours, and a sample of the solution is analyzed to measure the dissolved solids and to measure the unit molar ratio of dissolved silica to dissolved alumina. More than 10% of the 965° C. calcined halloysite is dissolved and the silica to alumina unit mol ratio is greater than 5. Such calcined halloysite is accordingly determined as being suitable for the alkaline aging treatment of the present invention. Thus, the alkaline leaching test is employed to control both the selection of the mineral and the selection of the conditions required for the calcination of the hydrated aluminosilicate mineral.

An alkaline slurry is prepared consisting essentially of 1 part by weight of sodium hydroxide, 5 parts of water and 5 parts of the reactive properly calcined aluminosilicate material, prepared by calcining halloysite at 965° C. The slurry is maintained quiescent at 40° C. for 36 hours and then subjected to mild agitation with paddle stirring at about 40 revolutions per minute during the heating of the composition at 95° C. and during the aging of the composition at 95° C. for a period of 36 hours. A stream of water is added so that the total amount of water employed is 40% greater than that initially employed. That is, 2 parts of water are added during the 24 hours of hot aging so that a total of 7 parts of water are present after hot aging. The viscosity of the composition tends to increase during the hot aging. A stirrable viscosity can be maintained more readily by modifying the composition subsequent to 40° C. aging by adding water during the hot aging.

A sample of halloysite is calcined at 600° C. for 2 hours to provide a material which, although failing to pass the alkaline leaching tests, tends to react with aqueous alkali to provide high green strength particles without calcination. Thus, such calcined halloysite added to the alkaline slurry serves as a binder for alkalyzed aged clay particles prior to and during final calcination.

The hot slurry from the hot aging operation is ball milled to produce a dispersed slurry of very fine particles. About 13 parts by weight of said milled slurry are mixed with approximately 2 parts by weight of the 600° C. calcined halloysite to produce a paste which is promptly shaped into cylindrical pellets. Said pellets are allowed to age and dry at about 10–30° C. for a period of about 6 hours, during which the 600° C. calcined halloysite reacts with the excess alkali in the pellets to produce particles which are resistant to disintegration when subjected to an aqueous solution. As the water content of the pellets is lowered from about 46% to a lower amount during the ambient aging and drying, some shrinkage of the pellets may occur but such drying does not cause extensive fracture of the pellets.

The aged pellets are treated with a solution of ammonium nitrate and subjected to ammonium-exchange with the amount of ammonium salt corresponding to several times the stoichiometric quantity of sodium compound in the pellets. The ammonium-exchanged pellets are water-washed and dried prior to a stabilization treatment.

In order to adjust the cracking activity of the pellets to an activity which can be maintained during weeks of commercial usage, the pellets are treated with steam at 730° C. for 4 hours. The combination of activity, selectivity, and stability of the cracking catalyst pellets is rated as good after such steam stabilization.

Example 11

Catalyst pellets are prepared from 965° C. calcined halloysite by the general procedure of Example 10. However, the quiescent aging of the slurry at 40° C. is conducted for about 30 hours, followed by 12 hours of agitation at ambient temperature and 30 hours of agitated aging at 95° C. Moreover, during hot aging the slurry is modified by addition of a solution containing 1.25 parts of water and 0.25 parts of sodium hydroxide, whereby the weight ratio of water to sodium hydroxide is maintained constant but the aluminum disilicate to sodium hydroxide unit ratio is reduced from 5 to about 4. The aged composition is ball milled to produce a dispersed slurry. Just prior to the pellet shaping operation, 5 parts of 600° C. calcined halloysite are added to the milled slurry, so that the water content of the extruded pellets is only about 38%, thus decreasing the problems of shrinkage during the drying and aging of the shaped pellets at about 20° C. for about 6 hours. The ion-exchange and stabilization treatments follow the conventional procedures for catalyst production subsequent to aging at high pH. The catalyst granules have advantageous attrition resistance and a sufficient degree of activity, selectivity, and stability to be superior to cracking catalyst particles such as have been used commercially in recent decades.

Example 12

A mixture of water, halloysite and starch (or other agent imparting high porosity to the calcined pellets) is extruded into strands which are sliced into pellets and transferred to a calciner. During a period of about 12 hours, including about 4 hours at the peak temperature of 965° C., the modifying agent (e.g., starch) is burned and the halloysite pellets are dehydrated. About 83 parts of cooled pellets are tumbled as they are sprayed with 100 parts of 16.67% NaOH solution, all the liquid being sorbed into the particles, providing reactive composition having the proportions of 1 part of NaOH, 5 parts of 965° C. calcined halloysite, and 5 parts of water. The impregnated pellets are immersed in mineral oil and aged under oil at ambient temperature (25° C.) for 48 hours and then for 36 hours at 95° C. The oil is drained from the pellets, which are ion-exchanged with 600% excess solution of ammonium nitrate. The ammonium-exchanged particles are heated in steam at 730° C. for 4 hours to provide stabilized cracking catalyst particles superior to some previously marketed cracking catalyst particles.

Example 13

The procedure of Example 12 is followed except that the solution sprayed onto about 83 parts of tumbling calcined halloysite pellets for total absorption into the pellets consists of 83.3 parts of $H_2O$, 0.125 part of magnesium hydroxide, 0.167 part of calcium hydroxide, 4.44 parts of potassium hydroxide, 3.8 parts of tetramethyl ammonium hydroxide, 2 parts of lithium hydroxide, and 8.33 parts of sodium hydroxide. The composition consists essentially of the same 1:5:5 proportions of Example 12 except that other basic hydroxides have been stoichiometrically substituted for about half of the sodium hydroxide. The alkalinity contribution in the mixture is thus about 20% by lithium hydroxide, about 10% by tetramethyl ammonium hydroxide, about 1% each by calcium hydroxide and magnesium hydroxide and about 18% by potassium hydroxide, the remainder of the alkalinity being provided by the sodium hydroxide. After the ambient and hot aging, ammonium-exchange, and steam stabilization, the pellets are effective as cracking catalyst particles. The residual content of alkaline oxide is less than 2% notwithstanding the presence of a plurality of hydroxides during the alkaline aging steps.

*Alkaline leaching tests.*—Several minerals, including pyrophyllite, petalite and hydrated feldspathic minerals, are calcined at a series of temperatures in the range from 400° C. to 1400° C. Each calcined pulverized sample is less than 10% soluble in six times its weight of 5 molar sodium hydroxide after 48 hours, thus failing to pass the alkaline leaching test. Each calcined pulverized sample is processed by the catalyst production procedures of the type described in Examples 1–11 and shown to be very poor as a cracking catalyst. Thus, it is shown that the procedures effective for making effective cracking catalysts from calcined perlite or calcined halloysite are ineffective for calcined pyrophyllite, or calcined petalite, or calcined feldspathic mineral. A basis was established for utilizing the alkaline leachnig test in making the correct selection of the suitability of hydrated aluminosilicate minerals as precursors and in making the correct selection of calcination conditions for preparing a properly calcined aluminosilicate material as raw material for catalyst production. It is convenient to describe a procedure as involving a selection of a hydrated aluminosilicate mineral and the selection of calcination conditions effective for preparing from such hydrated aluminosilicate mineral a properly calcined aluminosilicate material, but it is apparent that a mineral is rejected (as most minerals are) unless effective calcination conditions are determined. Catalyst technologists normally would not group minerals such as perlite and halloysite in a category different from pyrophyllite, and the usefulness of the alkaline leaching test in bringing together in a generic grouping the properly calcined aluminosilicate materials suitable for processing into useful cracking catalyst compositions distinguishes such alkaline leaching test from those previously employed in catalyst-making technology.

*Summary of limitations on alkaline leaching tests.*— Numerous tests were conducted to establish criteria for the determination of the suitability of a naturally occurring mineral for the manufacture of a cracking catalyst by an alkaline aging procedure. In order to be suitable, the mineral must have, on an anhydrous basis, a predominant weight of aluminosilicate, and must contain more silica than alumina. The ratio of aluminum atoms to metal atoms other than silicon and alkali metal atoms must be greater than 10:1 for each alkaline earth metal atom; to each of any other metal atoms the ratio must be greater than 20:1; and the ratio of aluminum atoms to iron atoms in the mineral must be greater than 30:1. The mineral must be hydrated, that is, is must contain water which is removable as volatile matter at a sufficiently elevated temperature, but which is not removable by drying at a drying temperature such as 110° C. The thus defined hydrated aluminosilicate mineral is so selected that the properly calcined aluminosilicate material passes the described alkal*i*ne leaching test. The calcination of the mineral must be conducted at a temperature significantly hotter than required for evolution of most of the hydrate water, but at a temperature low enough to avoid sintering. If the calcined product passes the alkaline leaching test, it is a properly calcined aluminosilicate material. In the alkaline leaching test, a sample of the pulverized calcined mineral is subjected to leaching with six times its weight of 5 molar solution of aqueous sodium hydroxide and the leaching is continued for 48 hours at ambient temperature. In the resulting solution, the unit mol ratio of dissolved silica to dissolved alumina must be within the range from 5 to 25 if the calcined mineral is to pass the alkaline leaching test, and the total dissolved silica plus dissolved alumina must amount to at least 10% of the calcined sample, if the mineral is to pass the alkaline leaching test. Thus, the alkaline leaching test is relied upon both for the selection of the hydrated aluminosilicate mineral and for the selection of the calcination conditions. If the calcined minerals fails to pass the alkaline leaching test, it is rejected notwithstanding its apparently plausible relationship to other materials found to be useful in preparing cracking catalysts by alkaline aging techniques.

Examples 14–16

The iron content of a commercially available halloysite was extremely low, providing a catalytic grade of hydrated aluminum disilicate. The halloysite was heated in a rotating drum at 1000° C. for 4 hours during which a stream of air flowed through the drum to sweep out volatile matter, such as stream, evolved during the heating.

In a series of preparations of diluted sodium faujasite, the 1000° C. calcined halloysite was dispersed in aqueous sodium hydroxide, cold aged, hot aged, washed, dried, comminuted, humidified, and analyzed by X-ray diffraction for sodium faujasite. The standard procedure involved preparing a solution of sodium hydroxide of the required concentration and power stirring during the dispersion of 222 g. of calcined halloysite in such solution, and continuing the stirring for about 15 minutes. The container was placed in a water bath maintained at 37° C. and aged therein for 40 hours. Care was taken to preserve the proportions of reactants and to minimize evaporation. Then the container was placed in an oven maintained at 95–98° C. for 24 hours. The hot-aged product was washed successively with benzene, pentane, acetone, and then water to remove traces of impurities. The product was vacuum dried at 100° C. to remove all except the bound water. A sample was comminuted to pass entirely through a 200 mesh sieve (i.e., particles less than about 75 microns). The product was equilibrated to 50% relative humidity and analyzed for sodium faujasite content by standard procedures of X-ray diffraction.

The proportions were based upon weight ratios of calcined halloysite to sodium hydroxide and water to sodium hydroxide. Data concerning some of these preparations are set forth in the following table:

| Example | Weight ratios in dispersion | | | Faujasite in product | |
|---|---|---|---|---|---|
| | NaOH | Calcined halloysite | H₂O | Percent | SiO₂/Al₂O₃ mol ratio |
| 14 | 1 | 5.15 | 5.15 | 29 | 4.6 |
| 15 | 1 | 5.15 | 7.20 | 36 | 4.4 |
| 16 | 1 | 5.15 | 10.0 | 25 | 4.3 |

Thus sodium faujasite was prepared by alkaline aging of halloysite which had been calcined at a temperature in the 965° C. to 1095° C. range.

Cracking catalysts are prepared by milling the solids from the hot aging to produce particles in which the mean particle size is less than about 2 microns, partially drying, shaping into cylindrical pellets about 4 mm. long and 4 mm. diameter, ion-exchanging with ammonium nitrate solution, and stabilizing the pellets in steam at 775° C. for 4 hours. Such cracking catalyst particles are tested and are classified as having a good rating with regard to the combination of activity, selectivity, and stability.

Examples 17-21

A catalytic grade of kaolin was calcined for three hours at 1010° C. to prepare a reactive aluminum disilicate. The reactive aluminum disilicate was dispersed in aqueous caustic solution to provide a composition consisting of 5 parts of reactive aluminum disilicate, 5 parts of water, and 1 part of NaOH. The dispersion was aged quiescently at 37° C. for 40 hours and then maintained at 95° C. for quiescent hot-aging for 24 hours. The hot-aged material was ball milled to provide a slurry in which the solids had a mean particle diameter of less than about 1 micron. From the master batch of pilot-plant produced slurry, several cracking catalysts were prepared by spray drying. For some catalysts, sodium silicate binder was added prior to spray drying, the quantity of sodium silicate being expressed in terms of the silica added as a binder. The dispersion was spray dried at about 430° C. to provide fluidizable particles of a sodium precursor of a fluidizable cracking catalyst. The spray dried particles (microspheres having diameters within a range from about 15 to about 150 microns) were ion-exchanged with aqueous ammonium nitrate, and then dried in steam at 730° C. Attrition tests were conducted on the thus prepared fluidizable cracking catalyst particles, and the attrition loss was expressed as average weight percent loss per hour during the last 17 hours of a 22 hour test. The residual content of Na₂O after ion-exchange was also measured. The quantity of sodium faujasite in the hot-aged master-batch was about 35% and the silica to alumina unit mol ratio was about 4.97. Further data relating to the series of catalysts are shown below:

| Example | Percent SiO₂ binder | Percent faujasite | Percent Na₂O | Attrition per hour |
|---|---|---|---|---|
| 17 | 0 | 35 | 1.16 | 0.76 |
| 18 | 5 | 29 | 1.03 | 0.82 |
| 19 | 12 | 26 | 0.91 | 0.37 |
| 20 | 20 | 26 | 0.96 | 0.26 |
| 21 | 25 | 25 | | 0.05 |

The fluidizable cracking catalyst particles were pelleted and subjected to various accelerated aging tests, consisting of heating the catalyst for 4 hours in 100% steam at a temperature indicative of the severity of the accelerated aging. Then the artificially aged cracking catalysts were evaluated by a standard procedure for the cracking of gas oil in the presence of steam to produce gasoline, coke, and gas as indicated in a table:

| Ex. | °C. (H₂O, 4 hr.) | Gaso., vol. percent | Coke, wt. percent | Gas, wt. percent | Gas grav. | Conv., wt. percent | Selec., wt. percent |
|---|---|---|---|---|---|---|---|
| 17 | 816 | 62.8 | 3.0 | 19.2 | 1.41 | 77 | 71 |
| 18 | 730 | 59.8 | 5.9 | 26.9 | 1.60 | 86 | 62 |
| 18 | 816 | 66.0 | 2.2 | 16.5 | 1.58 | 77 | 76 |
| 19 | 730 | 62.3 | 4.2 | 23.3 | 1.59 | 83 | 66 |
| 19 | 816 | 65.6 | 1.7 | 15.4 | 1.46 | 75 | 77 |
| 20 | 730 | 56.6 | 6.4 | 28.3 | 1.66 | 84 | 59 |
| 20 | 816 | 63.1 | 1.7 | 11.9 | 1.56 | 69 | 81 |
| 21 | 770 | 65.5 | 2.4 | 14.6 | 1.55 | 75 | 79 |
| 21 | 816 | 55.1 | 1.4 | 7.5 | 1.45 | 57 | 85 |

Attention is directed to some of the data after 816° C. steam aging in relation to the silica binder content in the catalyst as follows:

| Example | Percent SiO₂ added | Gaso., vol. percent | Conv., wt. percent | Selec., wt. percent | Conv. X selec. |
|---|---|---|---|---|---|
| 17 | 0 | 62.8 | 77 | 71 | 55 |
| 18 | 5 | 66.0 | 77 | 76 | 59 |
| 19 | 12 | 65.6 | 75 | 77 | 58 |
| 20 | 20 | 63.1 | 69 | 81 | 56 |
| 21 | 25 | 55.1 | 57 | 85 | 48 |

Technologists familiar with the effects of 816° C. aging upon selectivity and gasoline yield of conventional cracking catalysts can recognize that the performance data for Examples 18, 19 and 20 are outstanding. Catalysts featuring addition of amounts of silica binder within a range from about 5% to about 20% by weight of the catalyst have desirable gasoline-producing properties long sought but previously not readily attained.

The performance of the various catalysts indicated that the two-stage quiescent aging of 1010° C.-calcined kaolin (proportions of 5 parts aluminum disilicate, 5 parts water, 1 part sodium hydroxide in combination) provided a useful precursor for cracking catalyst production.

Example 22

Kaolin particles of the 0.5 to 10 micron size range were calcined in a rotating drum at 1010° C. for 3 hours to provide a reactive aluminum disilicate. The procedure of the previous example was modified in adding water subsequent to aging at 37° C. Two parts of additional water were added during the hot aging so that at the end of the hot aging the proportions of the slurry were equivalent to one part of NaOH, five parts of aluminum disilicate, and 7 parts of water. The hot aged slurry was ball milled to grind all solids to provide a mean particle size less than about 1 micron, and then spray dried to form fluidizable particles. After ion-exchange, the ammonium-form product contained 26% ammonium faujasite having a $SiO_2/Al_2O_3$ unit mol ratio of 5.0. After steam stabilization, the particles are rated as effective cracking catalyst particles.

Examples 23–25

A sample of catalytic grade kaolin clay purchased on the open market had an iron content of less than 0.3%. Most of the particles were of the 1 to 12 micron size range. Said clay was employed in preparing sodium faujasite distributed throughout an aluminosilicate matrix.

A laboratory calcining apparatus consisted of a rotating drum about 2 meters long and about 17 cm. diameter. A circumferential gas flame between the insulating shell and the rotating drum heated a zone near the middle of the length of the drum. This calcining unit was designed for continuous operation so that the powder treated therein would have a residence time in the hot zone of about 2 hours. Thermocouples were positioned near the edge of the flame zone, and near the center of the treatment zone and in the tumbling bed of clay being calcined. Reactive aluminum disilicate was prepared by calcining the kaolin for two hours at 995° C. during which a stream of air flowed through the drum to sweep out evolved volatile matter.

By employing 1 part by weight of sodium hydroxide, 6 parts by weight of water, and 5 parts by weight of the calcined aluminum disilicate, and following the general procedure of the previous examples, the solids content of the product from hot aging contained 18% sodium faujasite having a silica to alumina ratio of 4.83. When for each weight of sodium hydroxide, the weight of reactive aluminum disilicate and water each was 4.55, the product contained 59% sodium faujasite, but the silica to alumina unit mol ratio was only 4.20. The increase in water ratio to 5.45 instead of 4.55 permitted the preparation of a product containing 70% sodium faujasite having a silica to alumina unit mol ratio of 4.20. Said results can be tabulated as follows:

| Example | Weight ratios in slurry | | | Product | |
|---|---|---|---|---|---|
| | Wt. NaOH | Wt. kaolin (995° C., 2 hrs.) | Wt. H$_2$O | Percent sodium faujasite | SiO$_2$/Al$_2$O$_3$ mol ratio |
| 23 | 1 | 5 | 6 | 18 | 4.83 |
| 24 | 1 | 4.55 | 4.55 | 59 | 4.20 |
| 25 | 1 | 4.55 | 5.45 | 70 | 4.20 |

By expressing the composition of the slurries in mol ratios, the results can be tabulated as follows:

| Ex. | Mol ratios in slurry | | | Product | |
|---|---|---|---|---|---|
| | Na$_2$O/SiO$_2$ | H$_2$O/Na$_2$O | H$_2$O/Al$_2$O$_3$ | Percent sodium faujasite | SiO$_2$/Al$_2$O$_3$ mol ratio |
| 23 | 0.278 | 26.7 | 14.8 | 18 | 4.83 |
| 24 | 0.305 | 20.2 | 12.3 | 59 | 4.20 |
| 25 | 0.305 | 24.2 | 14.8 | 70 | 4.20 |

By using the general procedure of previous examples, the solids from the hot-aged slurries are converted to effective cracking catalyst particles comprising diluted hydrogen faujasite.

Examples 26–28

Several preparations were made by using the same rotating drum calciner and the same commercially available catalytic grade of kaolin clay, but calcining at 1035° C. Diluted sodium faujasite was prepared by the general procedure of the previous examples. The product obtained after aging of a mixture consisting of 5 parts of calcined kaolin, 5 parts of water, and 1 part of sodium hydroxide had a silica to alumina unit mol ratio of 5.09, and the sodium faujasite content was 29%. The attainment of such a high silica to alumina ratio while still achieving approximately 30% sodium faujasite was deemed particularly advantageous. The yield of sodium faujasite was increased to 34% by lowering the weight ratio of calcined kaolin to NaOH and water to NaOH each to 4.55 instead of 5. However, the silica to alumina unit mol ratio of the 34% sodium faujasite was 4.65. A still higher yield (i.e., 48%) of sodium faujasite was obtained using the combination of 5.45 parts of water, 4.55 parts of calcined kaolin and 1 part of NaOH. The silica to alumina unit mol ratio was 4.52. Under some circumstances the higher silica to alumina ratio faujasite products are preferred. Said results can be tabulated as follows:

| Example | Weight ratios in slurry | | | Product | |
|---|---|---|---|---|---|
| | Wt. NaOH | Wt. kaolin (1,035° C., 2 hrs.) | Wt. H$_2$O | Percent sodium faujasite | SiO$_2$/Al$_2$O$_3$ mol ratio |
| 26 | 1 | 5 | 5 | 29 | 5.09 |
| 27 | 1 | 4.55 | 4.55 | 34 | 4.65 |
| 28 | 1 | 4.55 | 5.45 | 48 | 4.52 |

The proportions can be expressed as mol ratios as follows:

| Ex. | Mol ratios in slurry | | | Product | |
|---|---|---|---|---|---|
| | Na$_2$O/SiO$_2$ | H$_2$O/Na$_2$O | H$_2$O/Al$_2$O$_3$ | Percent sodium faujasite | SiO$_2$/Al$_2$O$_3$ mol ratio |
| 26 | 0.278 | 22.2 | 12.3 | 29 | 5.09 |
| 27 | 0.305 | 20.2 | 12.3 | 34 | 4.65 |
| 28 | 0.305 | 24.2 | 14.8 | 48 | 4.52 |

The diluted sodium faujasite is suitable for preparation of cracking catalyst particles by the steps of ball milling, spray drying, ammonium exchanging, and steam stabilization as described in previous examples. The sodium faujasite composition has utility for end-uses other than cracking catalyst. Sorbents and drying agents can be made from such compositions comprising sodium faujasite.

Example 29

Reactive aluminum disilicate particles are prepared by heating catalytic grade kaolin particles of from about 1 to about 5 microns in a rotating drum at about 1020° C. for about 4 hours. A slurry composition consists of 1 part of NaOH, 5 parts of said reactive aluminum disilicate, and 5 parts of water. The composition is aged quiescently for 60 hours at 25° C. and then aged quiescently for 60 hours at 90° C.

The hot aged slurry containing about 30% sodium faujasite (dry basis) is comminuted in a ball mill so that the predominant (i.e., most of the weight) particle size is less than about 1 micron, and the milled slurry is pumped toward apparatus designed to form an oil dispersion of microspheres. In order to increase the solids content of the dispersion and to lower the faujasite content to the range of 20% to 25%, a slurry of meta kaolin, prepared by calcining kaolin at 600° C. for 2 hours, is injected into and mixed with the flowing stream of milled slurry. The stream then receives an injection of nitric acid. sufficient nitric acid is added to lower the pH of the mixture to approximately pH 10 at the point of its injection into the oil. Some gelation of the alkaline aluminosilicate mixture is potentially feasible by reason of the added acid. While the gelation is occurring, the stream is injected into and dispersed in an oil in which the stream is immiscible, thereby forming microspheres which rapidly harden sufficiently that agglomeration of the dispersed particles is avoided. The oil in which the microspheres are formed and hardened is a mixture of tetrahydronaphthalene and tetrachloroethylene having a density closely resembling that of damp fluidizable particles of sodium precursor of cracking catalyst.

The microspheroidal particles remain dispersed in the oil during approximately 1 hour. After the microspheroidal particles have hardened sufficiently to resist interparticle adhesiveness, they are separated from the oil, dried, and ion-exchanged with a hot solution of ammonium nitrate, ammonium sulfate, or other ammonium salt. The ammonium-exchanged particles are water washed, dried at about 200° C., and shipped to the cracking unit of a petroleum refinery. The fluidizable cracking catalyst particles are introduced as make-up catalyst into the kiln of a catalytic cracking installation and given a stabilizing treatment at the elevated temperature within the regenerator.

Example 30

Kaolin is calcined for one hour at 1050° C. to prepare reactive aluminum disilicate particles, which are dispersed in an equal weight of water containing sodium hydroxide and other alkaline materials providing a ratio of 5 weights of aluminum disilicate per weight of sodium hydroxide equivalent. Approximately one-fourth of the sodium hydroxide is replaced by a stoichiometrically equivalent mixture of lithium hydroxide, magnesium hydroxide, potassium hydroxide, tetramethylammonium hydroxide and calcium hydroxide. Relatively insoluble hydroxides such as magnesium hydroxide preferentially concentrate in the sodium faujasite product, and can be used in proportions greater than their solubility limits might indicate. Any of a variety of percentage distributions (e.g., equal percentage for each of the five hydroxides) amongst the stoichiometric substitutions of other hydroxides for a part of the NaOH is suitable. This dispersion is aged quiescently at 30° C. for 5 days and at 118° C. for 5 hours and then ball milled to provide a mean particle size less than about 1 micron.

A meta kaolin is prepared as in the previous example and mixed with the comminuted slurry. The meta kaolin binder is about 40% by weight of the total $Al_2O_3$ and $SiO_2$ content of the alkaline dispersion. Sufficient acid is injected to lower the pH to about pH 10 prior to formation of the microspheroids by dispersion of the stream in the oil of controlled density. The microspheroids are separated from the oil, washed with pentane, vacuum dried, ion-exchanged with an ammonium salt, water washed, dried, and shipped to the refinery. Ammonium faujasite can be prepared from magnesium-containing faujasite by ion-exchange. The residual sodium oxide equivalent in the particles after ammonium ion-exchange is of the same order of magnitude whether or not magnesium hydroxide or other alkaline hydroxides are employed.

After calcination the fluidizable cracking particles contain hydrogen faujasite in an aluminosilicate matrix and are noteworthy by reason of the function of the meta kaolin as a binder. By substituting meta kaolin for the sodium silicate binder, the total composition of the cracking catalyst remains substantially the same as for a conventional kaolin cracking catalyst.

Example 31

A mixture of meta kaolin and alkaline dispersion of diluted mixed (sodium, magnesium, calcium, etc.) faujasite prepared as in the previous example is directed to a bead forming machine to form beads. The distribution of cations in the mixed faujasite corresponds substantially to the average distribution in several samples of natural faujasite. After 12 hours aging in oil at about 40° C., the beads are processed into a bead form of cracking catalyst by ammonium ion-exchange and treatment with steam at an elevated temperature.

In a modification of the bead forming technique, the composition comprising the alkaline dispersion of diluted sodium faujasite and meta kaolin is aged and dried until its viscosity permits extrusion. The extruded strands are sliced into pellets. The pellets are heat hardened and then ammonium-exchanged, and calcined in the presence of steam at about 730° C. for about 4 hours to provide a pellet form of cracking catalyst. Ammonia and steam are volatilized as the ammonium faujasite component is transformed into a partially decationated hydrogen faujasite by the general procedure of Bates 2,283,173. The pellet form of catalyst may be employed in a catalytic cracking unit having a gravitating or moving bed of granular catalyst particles, or utilized as a fixed bed for any reaction benefiting from a catalyst having acid-type activity at elevated temperatures.

Example 32

Catalytic grade kaolin particles are calcified to provide an air-dispersible fraction. A calcining unit consists of about ten stages of beds in which the air-dispersible fraction is gas-suspended, whereby the average residence time of the powder being calcined can be regulated to within the range from about 3 to about 300 minutes. Treatment in such a cascade of gas-suspended particles is sometimes designated as fluidized calcination even though the particles are smaller than employed in a fluidized bed of cracking catalyst. Such fluidized calcination permits more rapid sweeping of the steam from the kaolin particles, whereby kaolin is treated in the 965–1095° C. range during a relatively brief residence time.

Kaolin particles of the 1–10 micron size range are calcined in the cascade of fluidized beds at about 1030° C.±20° C. (the preferred range) to provide reactive aluminum disilicate particles.

A slurry is prepared of about equal parts by weight of water and reactive aluminum disilicate particles, the NaOH content being about 9.1% by weight. This slurry is aged quiescently at ambient temperaure for 48 hours and aged at about 100° C. for about 20 hours with supplemental additions of hot aqueous sodium hydroxide solution. The resulting slurry is ball milled until most of the weight consists of particles less than one micron, and the milled slurry is spray dried to provide fluidizable particles predominantly of the 15–150 micron size range. After ammonium-exchange and stabilization in steam the particles are effective as cracking catalyst particles.

Example 33

A diluted slurry of sodium faujasite is prepared and milled as in any of the previous examples and modified by the addition of sodium silicate providing, on the dry aluminosilicate basis, 10% added silica. The composition is spray dried, ion-exchanged, washed, dried, calcined, and employed as cracking catalyst. The activity, and selectivity after 815° C. steaming of the catalysts are superior to corresponding catalysts lacking silicate binder.

Example 34

A hydrated aluminum disilicate gel powder is prepared by the conventional mixing of aqueous solutions of sodium silicate, sulfuric acid, and aluminum sulfate, followed by exhaustive ammonium ion-exchange of a slurry of the gelatinous solids and drying of the slurry. The hydrated powder is heat treated at 1000° C. to prepare a reactive aluminum disilicate which is used as in Example 17 to prepare a fluidizable cracking catalyst having a combination of activity, selectivity, and stability superior to some commercially employed catalysts.

Example 35

Natural chabazite, consisting essentially of

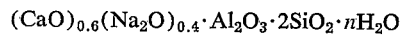

is ammonium ion-exchanged, heated at 400° C. to prepare hydrogen chabazite, and steamed at 100° C. to prepare a hydrated aluminum disilicate. This hydrated aluminum disilicate is heat treated at 1030° C. and cooled to provide an aluminum disilicate having the reactivity required for synthesizing cracking catalyst comprising hydrogen faujasite by the general procedure of Example 17.

*Summation of limitations on aluminum disilicate.*— Numerous tests were conducted to establish criteria for the preparation of useful compositions from natural or synthetic hydrated aluminum disilicate by slurry aging and comminution of the hot-aged composition. The catalytic grade of aluminum disilicate is substantially free from iron. At some stage, the aluminum disilicate is hydrated, and it is thermally dehydrated within the temperature range from about 965° C. to about 1095° C. to convert it into a reactive aluminum disilicate.

This reactive aluminum disilicate is dispersed in an aqueous sodium hydroxide solution to provide a weight ratio of reactive aluminum disilicate particles to sodium hydroxide equivalent within the range from 4:1 to about 6:1. The weight ratio of water to sodium hydroxide equivalent must be within a range from about 4:1 to about 10:1.

A slurry having the composition satisfying said weight ratios must be aged at a temperature within the range from 10 to 50° C. from about 5 hours to about 5 days. Seeding of the dispersion with sodium faujasite usually permits some shortening of such cold aging. The composition is heated to a temperature in the range from about 80° C. to about 120° C. and hot-aged for from about 5 hours to about 5 days. If desired, additional water and/or sodium hydroxide solution can be added during hot aging but the weight ratio of water to sodium hydroxide should not exceed about 10:1 nor be substantially less than during the ambient temperature aging.

The dispersion of diluted sodium faujasite thus prepared is comminuted so that substantially all particles (predominant amount by weight) are small and so that the mean particle size is less than about 10 microns, desirably less than 1 micron. Wet ball milling is a preferred comminuting method. The thus triturated solids, usually but not necessarily in an aqueous slurry, may be modified by the addition of sodium silicate or other suitable binder if a binder is desired. A composition consisting predominantly of finely comminuted precursor is shaped into particles by some operation such as spray drying, dispersion in oil, bead-forming, the combination of extrusion and slicing into pellets, or other suitable particle formation step. The feature of comminuting the solids into particles less than about 10 microns after slurry aging but before shaping the composition into particles is emphasized in distinguishing the present invention from other procedures. Sodium faujasite in an aluminosilicate matrix prepared by slurry aging and comminuting can be further processed for any of several end-uses, including use as ion-exchange solids for removing metal ions from a solution; water-softening zeolitic solids; drying agents; molecular sieves; and/or other products benefiting from the presence of faujasite. At present, cracking catalysts consume a much larger tonnage of faujasite than any other widely publicized end-use. Hence, it is convenient to describe the end-use for said composition as a cracking catalyst.

If the particles are scheduled for cracking catalyst production, they are ammonium exchanged by use of an aqueous solution of ammonium salt. It is generally not economic to remove spectroscopic traces of sodium, lithium, calcium, magnesium and/or potassium from the particles by ammonium exchange. Partly because the silica to alumina unit mol ratio of the faujasite exceeds 3.5, and partly for reasons not fully understood, the cracking catalysts of the present invention can tolerate relatively large amounts of sodium. By a series of tests, the upper limit for the $Na_2O$ equivalent has been established at 2% of the anhydrous weight of the cracking catalyst. The concentration of crystalline faujasite in precursors scheduled for transformation into cracking catalysts can be as high as 80% but is generally less than about 70%, and desirably in the 15% to 40% range.

Example 36

Powdered kaolin is sent through a rotating drum calciner in which the powder is maintained at a peak temperature of 1030° C.±20° C. for two hours to produce a calcined aluminum disilicate differing significantly from meta kaolin. A dry blend is prepared of equal parts of 1030° C.-calcined kaolin and powdered raw (uncalcined) kaolin.

An extruder having an auger feed is supplied with a composition formed by spraying a falling curtain of the dry blend with an aqueous sodium silicate solution, the supply rates providing 68.2 parts of the solution per 100 parts of the dry blend. The sodium silicate solution contains 26.7% of sodium silicate having a $Na_2O$ to $SiO_2$ weight ratio of 1:1.08, and may be prepared by any appropriate procedure. For example, a commercially available sodium silicate can be mixed with aqueous sodium hydroxide. Alternatively, 17 parts of finely divided silica can be dissolved in 100 parts of a solution containing 18.5% sodium hydroxide. The unit weight ratio of calcined koalin to sodium hydroxide in the composition fed to the extruder is about 4.42, as is also the unit weight ratio of water to sodium hydroxide.

The composition is extruded into strands and sliced into pellets immersed beneath a mixture of pentane and methylene chloride, the mixture having a density substantially the same as that of the freshly formed pellets whereby the bottom particles of a bed of such pellets in the equidensity oil are not deformed.

In making pelleted catalyst, the strands are sliced by a wire knife to form pellets, and the suspension of pellets in equidensity oil is pumped to the top of an aging tank. Significant spheroidizing of the pellets occurs as they are pumped to the aging tank and have sliding contact with various curved surfaces, inasmuch as the freshly extruded pellets retain quasiplasticity.

In making fluidizable catalyst particles, the extruded strands are fed into a zone of intense agitation adjacent to an impeller having a high peripheral speed, whereby the strands are broken to form tiny particles, which, under the influence of the agitation and oil, are shaped into microspheroids having diameters in the range from about 15 to about 150 microns. The dispersion of fluidizable particles in equidensity oil leaving the agitation zone should not be pumped as vigorously as the corresponding stream of suspended pellets. The likelihood of agglomeration of the particles during pumping of the suspension of fluidizable particles is greater inasmuch as the surface area per kilogram of kaolin particles is of a much higher order of magnitude. Gentle pumping of the product from the agitation zone to the aging tank permits transfer without troublesome agglomeration of the fluidizable particles. If desired, fines smaller than about 15 microns can be separated by selective fractionation procedures. Particles larger than about 150 microns are even more readily separated, as is usually desirable. Just prior to entering the aging tank, filtering means remove a large portion of the excess oil to provide a more concentrated dispersion of particles for plug flow through the aging tank.

Whether the particles are fluidizable or in pellet form, they gravitate from the top to the bottom of the aging tank at a temperature of about 25° C. for about 48 hours, undergoing transformations imparting increased hardness. In pumping the dispersion of aged particles from the bottom of the tank, they can be treated as rugged solid particles instead of deformable quasiplastic particles.

Attention is directed to a step of oil removal after ambient temperature aging. After drainage of much of the oil, the particles are heated in a humidified nitrogen stream to remove substantially all of the oil employed in ambient temperature aging. Pentant and methylene chloride boil at 36.2 and 40.1° C. respectively, so that a 60° C. nitrogen stream sweeps away most of the oil.

The advantageous results of the present invention are attributable primarily to a step of modifying the composition between aging at ambient temperature and aging at elevated temperature. The ambient-aged, de-oiled particles are briefly immersed in an aqueous solution, drained, and then subjected to the elevated-temperature aging under oil, whereby the aqueous solution absorbed during the brief immersion is a component of the composition during the hot-aging.

Inasmuch as some of the sodium content of the particles is readily leachable, the immersion solution may contain sodium ions leached from previously immersed particles. The immersion solution may contain NaOH without added silica, or the immersion solution may contain sodium silicate having a weight ratio of $SiO_2:Na_2O$ less than about 4, for instance, a concentration of $Na_2O$ less than 3.1% $Na_2O$, corresponding to 4% NaOH. If sodium silicate is included in the composition, the temperature of the immersion solution is adjusted to assure minimum viscosity and minimized thickness of the liquid film on the drained particles. During the hot-aging, the liquid film on the particles is incorporated into the particles, whereby the hot-aged particles do not have water-wet surfaces.

A high boiling lubricating oil is employed as the oil in which the particles are hot-aged. The hot-aging tanks desirably permit the particles to gravitate from top to bottom so that the dispersion of particles is pumped to the top of the tank and a dispersion of hot-aged particles is pumped from the bottom of the tank. A temperature of about 95° C. and within the range from 80 to 120° C. is maintained during the hot-aging. Because the particles are sufficiently rugged and non-adhesive and able to withstand the crushing effect of a bed of particles, the density of the oil can be significantly less than the density of the particles. Moreover, the crushing strength of the particles increases as the particles hot-age, whereby the hot-aged particles are rugged enough to withstand significant compression without deformation or fracture. As the result of cold and hot-aging, sodium faujasite is formed in a sodium aluminosilicate matrix, the calcined aluminum disilicate, sodium hydroxide, and water providing the principal reactants participating in the transformation to sodium faujasite, and the sodium silicate and raw kaolin diluent providing a major amount of the precursor for the sodium aluminosilicate matrix.

The particles are pumped from the hot-aging tank, and the oil is drained therefrom. The de-oiled particles are treated with a restricted amount of an aqueous solution of sulfuric acid, sufficient to react with the sodium silicate binder, but assuring the retention in the particles of an amount of sodium equivalent as sodium oxide approximately equal to that attributable to the sodium faujasite content of the particles. Such acid treatment must be so regulated that the pH of the effluent withdrawn is relatively high, such as from about 5 to about 9 and desirably about 7, inasmuch as the content of crystalline faujasite is adversely affected by excessively acid conditions. After acid-washing, the particles are ammonium-exchanged by treatment with a hot aqueous ammonium sulfate solution flowing countercurrently to the particles. Tanks similar to those used for hot-aging are suitable for the ion-exchange treatment. The duration of the ion-exchange treatment is regulated in response to particle size, fluidizable particles being converted to ammonium form much more rapidly than granular spheroids. The ammonium-form particles are filtered and washed. The particles are dried and then calcined in steam at 730° C. for several hours to produce cracking catalyst particles having an attractive combination of properties for cracking catalyst use.

Example 37

A colloidal solution is prepared consisting essentially of water and 26.7% sodium silicate having a weight ratio of $Na_2O$ to $SiO_2$ of 1:1.08. Said solution can also be described containing 13.85% $SiO_2$, 16.55% NaOH, and 69.6% water, providing a weight ratio of water to NaOH of about 4.2:1. Powdered kaolin is maintained at a peak temperature of 1030° C.±10° C. for two hours. A slurry is prepared consisting of 50 parts of said 1030° C. calcined kaolin and 68.2 parts of said solution of sodium silicate. The ratio of calcined kaolin to water to NaOH in said slurry is about 4.43:4.2:1.

The composition is aged as a slurry at 30° C. for 48 hours, during the last 4 hours of which the composition is subjected to ball milling to assure a uniform dispersion of the components in the slurry. The thus aged composition is modified by the addition of a slurry of 5 parts of water and 30 parts of a diluent such as bentonite, pyrophyllite, kaolin, montmorillonite, or the like. The presence of the diluent does not affect the ratios amongst the reactants so that the modified composition features ratios of calcined kaolin to water to sodium hydroxide of about 4.43:4.67:1. The composition is further processed toward utilization as a cracking catalyst by any appropriate procedure comprising the steps of hot-aging, ion-exchange, and stabilization, with a step of particle formation included at some stage prior to stabilization. For example, said composition consisting of diluent, ambient-aged calcined kaolin, water and sodium hydroxide is ball milled to provide mild agitation during 24 hours aging at 95° C. The hot-aged composition is fed to an extruder and the strands of extrudate are divided into catalyst-size particles, which are dried for 4 hours. The particles are treated for an average residence time of about 15 minutes in a continuous acidification bath in which acid is supplied at a rate assuring a pH from about 6 to 8 in the effluent liquid, whereby the particles retain an amount of sodium oxide approximately equal to that attributable to the sodium faujasite content of the particles. After acid-washing, the particles are treated with hot, aqueous ammonium sulfate solution for ammonium ion-exchange. The ammonium-form particles are water-washed, dried, and heated in steam at 700° C. for several hours. The resulting particles are useful as cracking catalyst particles by reason of their attractive combination of activity, selectivity and stability.

Example 38

Pulverized kaolin is calcined for 4 hours at 1030° C. An alkaline slurry is prepared consisting essentially of 1 part by weight of sodium hydroxide, 5 parts of water, and 5 parts of 1030° C. calcined kaolin. The slurry is maintained quiescently at 40° C. for 24 hours and then subjected to mild agitation with paddle stirring at about 40 revolutions per minute during the heating of the composition to 95° C. and during the aging of the composition at 95° C. for a period of 12 hours. A stream of water is added so that the total amount of water employed is 40% greater than that initially employed.

The hot-aged slurry is ball milled and spray dried to provide fluidizable particles. Ammonium exchange, water wash, and steam calcination steps complete the manufacture of cracking catalyst particles having a useful combination of activity, selectivity, and stability.

Example 39

Pulverized kaolin is calcined for 4 hours at 1030° C. to prepare a calcined kaolin, which is slurried with an equal weight of water containing sodium hydroxide equal to 9.1% of the slurry. The slurry is aged quiescently at 35° C. for 36 hours, after which steam is injected to agitate and heat the slurry for about 4 hours. Heat is provided to maintain the 95° C. temperature during 20 hours of hot-aging with paddle stirrnig of the composition. Although the initial ratio of components was 5 parts by weight of calcined kaolin, 5 parts of water and 1 part NaOH, the final ratio in the hot-aged slurry is 5 parts by weight calcined kaolin, 6 parts of water and 1 part of NaOH. The 20% increase in water is derived from the steam and permits the attainment of a slurry containing sodium faujasite while relying upon the steam to produce a suitable degree of initial agitation and heating.

By the previously-described steps of ball milling the hot-aged slurry, spray drying, exchanging with aqueous ammonium salt solution, washing, drying and calcining, fluidizable cracking catalyst particles are prepared. By X-ray diffraction of the sodium faujasite in the precursor for the cracking catalyst, it is shown that the faujasite content is about 25% and that the silica to alumina unit mol ratio of the faujasite is about 4.4. The cracking catalyst particles have a good combination of activity, selectivity and stability.

Example 40

A dry blend consisting of about 9 parts by weight of kaolin and about 1 part by weight of halloysite is calcined in a rotating drum at about 1030° C. for 90 minutes to prepare a reactive aluminum disilicate. To 1 part of this calcined aluminum disilicate, 2 parts of a dry blend of 9 parts of raw kaolin and 1 part of raw halloysite are mixed and the mixture converted into an extrudable dough by mulling with an aqueous dispersion of corn starch. The dispersion is prepared by boiling a 5% corn starch solution, cooling to ambient temperature, and dispersing additional starch therein. Various blends of relatively expensive halloysite and relatively cheap kaolin are possible, the halloysite content generally permitting extrusion more readily than kaolin and generally permitting shorter calcination at about 1030° C. in preparing reactive aluminum disilicate, and the use of 10% blends is illustrative of one engineering expedient.

The dough is extruded into strands, which are sliced into pellets. A rotating drum is employed to partially spheroidize the pellets and to dry the spheroidized pellets. The starch content imparts greater green strength to the dry spheroidized particles. The dried particles are transferred to the top of a gravitating bed of particles in a kiln and subjected to heating and cooling during passage through the kiln. The particles are heated to the peak temperature of about 550° C. for about 3 hours. The starch is burned from the pellets during calcination. The thus-prepared sorptive pellets are cooled to ambient temperature. Sorptivity measurements upon the calcined pellets show relatively high porosity in that they sorb approximately 70% water. This relatively high porosity is attributable in part to the inclusion of starch in the initial dough. Said procedure subjects to calcination at 550° C. about 63% of the aluminum disilicate so that about 63% of the sorptive pellets can be designated as meta-kaolin. The pellets are useful precursors for cracking catalyst because of their 37% content of aluminum disilicate calcined at 1030° C. to produce a material differing significantly from meta-kaolin.

The pellets are sprayed with a 28.5% solution of sodium silicate while in a falling curtain at conditions assuring absorption of a weight of said solution amounting to about 52% of the weight of the pellets. The sodium silicate has a weight ratio of sodium oxide to silica of 1:1.08. The thus-impregnated pellets have a ratio of about 4 parts of the 1030° C. calcined aluminum disilicate per part of sodium hydroxide and about 4 parts of water per weight of sodium hydroxide. The high sorptivity of the pellets is such that the aqueous solution is sorbed predominantly into the interior of the pellets, so that there is little tendency for the pellets to adhere to each other. The pellets are tumbled in a drum the atmosphere of which has about 100% relative humidity, the temperature being maintained at a substantially constant temperature (e.g., 25° C.) within the range from about 10 to about 30° C. for a period of 48 hours.

The thus cold-aged particles are sprayed with water while falling as a falling curtain so that the overall ratios of 1030° C. calcined aluminum disilicate to water to sodium hydroxide are shifted from 4:4:1 to about 4:5.9:1. The composition of the pellets then can be described as equivalent to the impregnation of 61% of 26.2% sodium silicate into the pellets comprising a matrix of 63% meta kaolin and 37% of the 1030° C. calcined aluminum disilicate. After this modification of the composition of the cold-aged pellets, they are immersed in a high boiling lubricating oil and aged while gravitating through the oil at a temperature of about 95° C. for about 20 hours.

The hot-aged pellets are de-oiled and treated with hot ammonium salt solution to reduce the residual sodium oxide content to less than about 2% of the anhydrous weight of the particles. The ammonium-form pellets are treated with steam at about 730° C. for about 4 hours to provide pellets having an advantageous combination of activity, selectivity, and stability in the cracking of hydrocarbons.

Example 41

Fluidizable cracking catalyst particles are prepared following the general procedure of Example 40 with modifications appropriate for the change of particle size. For example, the dough comprising starch, 1030° C. calcined kaolin, raw kaolin and water, is formed into microspheroids having a diameter of about 200 microns prior to calcination in a fluidized bed at about 550° C. The thus-calcined particles are cooled and elutriated to obtain the useful fraction having diameters within a range from about 40 to 150 microns. The separated fines are preferably recirculated to the dough-formation step to decrease the requirement for starting materials.

Fluidizable-size-range particles are subjected to the steps of cold-aging after impregnation with an aqueous solution containing sodium silicate and sodium hydroxide, modification of the composition by further impregnation with water, and hot-aging under oil. Hot-aging in a high-humidity tumbling drum instead of under oil permits production of useful cracking catalyst particles at a lower cost, but advantages are obtained by aging the water-impregnated particles under oil. The steam-stabilized particles derived from either type of hot-aging are superior to some fluidized cracking catalyst particles marketed in recent years.

Example 42

A mixture is prepared consisting of water and the following types of catalytic grade of kaolin:

|  | Parts by wt. |
|---|---|
| Raw kaolin diluent | 72.0 |
| Reactive kaolin, calcined at 1030° C. | 30.8 |
| Meta kaolin, calcined at 550° C. | 7.4 |
|  | 110.2 |

The slurry is spray dried at a temperature of 310° C. to provide dry fluidizable particles predominantly in a size range from about 40 to 150 microns. By a series of elutriation steps, the oversize and undersize particles are removed. The fluidizable particles are impregnated with a spray of an aqueous solution of sodium hydrovide while falling as a curtain adjacent to spray nozzles. The impregnated particles contain 4.5 parts of 1030° C. calcined kaolin, 5 parts of water, and 1 part of sodium hydroxide. The thus-impregnated particles are maintained at about 25° C. in a tumbling drum with about 100% relative humidity for a period of 48 hours, whereby the transformations generally described as occurring in ambient aging occur. After such ambient aging treatment, the particles are allowed to fall as a curtain adjacent to a spray adapted to impregnate the particles with an additional amount of water corresponding to about 2.5 parts of water per part of sodium hydroxide. Thus the reimpregnated particles correspond to a formulation of 4.5 parts of 1030° C. calcined kaolin, 7.5 parts of water and 1 part of sodium hydroxide. The fluidizable particles are immersed in a high-boiling lubricating oil for hot-aging at 95° C. for 24 hours. The hot-aging of fluidizable particles in the oil desirably is conducted as a batch operation instead of the continuous operation described in connection with granular particles. The oil is drained from the hot-aged particles which are treated with hot ammonium sulfate solution for an ion-exchange treatment reducing the sodium oxide content to below about 0.8%. The fluidizable particles comprising ammonium faujasite are treated with steam at about 730° C. to provide fluidizable cracking catalyst particles.

Example 43

Sodium silicate solution is treated with granules of an acid form of ion-exchange resin to provide an aqueous dispersion containing about 8% by weight of colloidal silica. A slurry is prepared consisting of said solution of colloidal silica and approximately equal parts of raw kaolin and 1030° C. calcined kaolin. The slurry is spray dried at about 300° C. to provide fluidizable particles. The fluidizable particles are heat-treated at 600° C. to convert the raw kaolin component to metal kaolin and to provide fluidizable particles of aluminum disilicate having a capacity for absorbing approximately 60 volume percent of water. The thus-prepared high-porosity fluidizable sorptive kaolin particles are subjected to a spray adapted to impregnate 16% sodium hydroxide solution into the internal portions of the particles. The thus-impregnated particles are maintained at substantially 100% relative humidity at ambient temperature for about 48 hours to provide ambient-aged particles.

A falling curtain of the ambient-aged particles is subjected to a spray adapted to be impregnate each particle with sufficient water to increase the ratio of water to sodium hydroxide from about 5 to 1 to about 6 to 1. The thus-reimpregnated particles are immersed in lubricating oil and aged at 95° C. for 24 hours. The lubricating oil is drained from the particles, which are treated with hot ammonium sulfate solution to provide particles comprising ammonium faujasite in an aluminosilicate matrix. Treatment of the ammonium-exchanged particles in steam at 730° C. for 4 hours stabilizes the particles for use as cracking catalyst particles.

Example 44

A kaolin clay was calcined at 1030° C. for 4 hours to prepare calcined kaolin. A slurry consisting of 5 parts by weight of the calcined koalin, 5 parts of water and 1 part of sodium hydroxide was aged quiescently at 35° C. for 36 hours. The ambient-aged composition was modified by the addition of sufficient water to provide a ratio of 7.5 parts of water per part of sodium hydroxide. The thus-diluted composition was heated to 95° C. and agitated by paddles rotating at 75 r.p.m. Samples were withdrawn to determine the characteristics of the hot-aged composition after a period of 6 hours, and again after 12 hours of such hot-aging. The withdrawn samples were shaped into particles, ion-exchanged with a hot ammonium salt solution, and steam stabilized at 775° C. for 4 hours. The performance of the catalyst after accelerated aging at 815° C. and at 845° C. was noted. The catalyst prepared by the method involving only 6 hours of hot-aging contained 8% crystalline faujasite, and thus was below the range of optimum faujasite content. The sample prepared after 12 hours of hot-aging at 95° C. contained 20% crystalline faujasite. The performance of the cracking catalyst after the severe accelerated aging treatment indicated that effective cracking catalyst could be prepared by a method comprising the addition of water to the composition being aged after ambient-temperature aging but prior to the termination of the hot-aging. CAT–D data for the catalyst prepared from the sample aged at 95° C. for 6 hours were as follows:

| | | |
|---|---|---|
| Accelerated-aging steam temp. (° C.) | 815 | 845 |
| Gasoline volume, percent | 60.5 | 50.1 |
| Coke weight, percent | 1.5 | 1.4 |
| Gas weight, percent | 11.7 | 8.2 |
| Gas gravity | 1.55 | 1.43 |
| Conversion weight, percent | 66.4 | 53.7 |

The CAT–D data for the performance of the catalyst subjected to 12 hours of hot aging are set forth as follows:

| | | |
|---|---|---|
| Accelerated-aging steam temp. (° C.) | 815 | 845 |
| Gasoline volume, percent | 65.4 | 58.5 |
| Coke weight, percent | 1.9 | 1.4 |
| Conversion weight, percent | 75 | 64 |

The results obtained in this series of preparations of cracking catalyst samples indicated that cracking catalyst particles having an attractive combination of activity, selectivity and stability for the preparation of gasoline from gas oil could be prepared by a method in which the composition of the alkaline aging mixture was altered after ambient temperature aging but prior to the termination of the hot-aging.

Example 45

A composition is prepared containing starch as a porosity agent, water, and kaolin previously calcined at about 1030° C. The composition is subjected to pressure-mixing, such as by extrusion or mulling and the thus-mixed composition is shaped into particles of desired size. Thereafter the particles are heated at 600° C. in the presence of oxygen, whereby the porosity-producing agent is burned from the particles. The calcined particles are cooled and found to have a porosity of about 70%, that is, capable of absorbing water in an amount constituting 70% by weight of the sorptive kaolin particles. The thus-prepared sorptive kaolin particles are impregnated with aqueous sodium hydroxide at conditions adapted to provide ratios of 5 parts by weight of sorptive kaolin, 5 parts of water and 1 part of NaOH and subjected to ambient aging for 36 hours at about 35° C. The particles are reimpregnated with water to increase the weight ratio of water in the particles from 5 to 7:1 part of NaOH and the hot-aging is conducted at about 95° C. for about 24 hours. The hot-aging particles are treated with hot ammonium salt solution and steam-stabilized to provide cracking catalyst particles having an advantageous combination of activity, selectivity and stability for the preparation of gasoline from gas oil.

What is claimed is:

1. The method of preparing a composition effective as a cracking catalyst which method consists essentially of:
    (A) selecting a naturally occurring hydrated aluminosilicate mineral having a greater weight of combined $SiO_2$ than combined $Al_2O_3$ and less other metal oxides than the total of $SiO_2$ and $Al_2O_3$, and having a ratio of aluminum atoms to metal atoms other than alkali metal atoms greater than about 10:1 for each of any alkaline earth metal atoms, greater than about 20:1 for each of any other metal atoms, the ratio of aluminum atoms to iron atoms being greater than about 30:1, and calcining said hydrated aluminosilicate mineral below sintering temperature and at a temperature significantly hotter than the temperature at which a major portion of the hydrate water is evolved, the mineral being selected and the calcination conditions being selected to provide a properly calcined aluminosilicate material which, when treated in pulverized condition for 48 hours at ambient temperature with six times its weight of 5 molar sodium hydroxide, provides a solution in which the unit molar ratio of dissolved silica to dissolved alumina is greater than 5 but less than 25 and in which solution the total of dissolved silica and dissolved alumina is more than 10% of the pulverized sample of properly calcined aluminosilicate material;
    (B) preparing a composition in which the significant reactants are the combination of said properly calcined aluminosilicate material and an an aqueous alkaline hydroxide solution, the concentration of the properly calcined aluminosilicate material in relation to the water and alkaline hydroxide being controlled to provide a weight ratio of aluminosilicate to sodium hydroxide equivalent within the range from about 1.25:1 to about 7:1 and to provide a weight ratio of water to sodium hydroxide equivalent within the range from about 3:1 to about 8:1, said alkaline hydroxide being selected from the group consisting of:
  (a) sodium hydroxide and
  (b) mixtures of sodium hydroxide with at least one of the group lithuim hydroxide, magnesium hydroxide, potassium hydroxide, lower alkyl quaternary hydroxides, and calcium hydroxide, any alkaline hydroxide other than sodium hydroxide being deemed to increase stoichiometrically the weight of sodium hydroxide, such adjusted weight of sodium hydroxide being designated as the weight of sodium hydroxide equivalent;

(C) maintaining said composition at about ambient temperature during an aging period of from about 8 to about 60 hours;

(D) heating ambient-aged composition to a temperature in the range from about 80 to 120° C., and maintaining said composition within said range for from about 8 to about 60 hours while keeping the weight ratio of water to sodium hydroxide equivalent less than about 12:1 and not substantially less than during the aging at ambient temperature to provide a hot-aged composition;

(E) treating by ion exchange a composition consisting predominantly of the solid components of said hot-aged composition with aqueous ammonium salt solution so that the residual content of sodium oxide equivalent is less than about 2% of the anhydrous weight of such ion exchanged composition, thereby producing a composition which when heat-stabilized under conditions at which ammonia is evolved, has an effective combination of activity, selectivity, and stability as a cracking catalyst.

2. The invention of claim 1 in which the naturally occurring hydrated aluminosilicate mineral is perlite.

3. The method of preparing a composition containing from 5% to 80% of crystalline sodium faujasite supported in an aluminosilicate matrix, which method consists essentially of:

(A) preparing finely divided dehydrated reactive aluminum disilicate particles by heating finely-divided, catalytic-grade hydrated aluminum disilicate particles at a temperature within the range from about 965° C. to about 1095° C.

(B) preparing an aqueous alkaline slurry by dispersing the reactive aluminum disilicate particles of (A) in aqueous alkaline hydroxide solution, the concentration of the aluminum disilicate in relation to the water and alkaline hydroxide being controlled to provide a weight ratio of aluminum disilicate to sodium hydroxide equivalent within the range from about 4:1 to about 6:1 and to provide a weight ratio of water to sodium hydroxide equivalent within the range from about 4:1 to about 10:1 during aging steps (C) and (D) hereinafter, said alkaline hydroxide being selected from the group consisting of:
  (a) sodium hydroxide and
  (b) mixtures of sodium hydroxide with at least one of the group lithium hydroxide, magnesium hydroxide, potassium hydroxide, lower alkyl quaternary hydroxides, and calcium hydroxide, any alkaline hydroxide other than sodium hydroxide being deemed to increase stoichiometrically the weight of sodium hydroxide, such adjusted weight of sodium hydroxide being designated as the weight of sodium hydroxide equivalent;

(C) maintaining composition (B) at a temperature in the range from about 10° C. to about 50° C. during an aging period of from about 5 hours to about 5 days;

(D) thereafter maintaining a temperature in the range from about 80 to 120° C., for from about 5 hours to about 5 days to provide a hot-aged composition; and (E) comminuting the wet hot-aged composition from (D) to provide particles consisting predominantly of particles less than 10 microns diameter, said particles consisting essentially of from 5% to 80% crystalline sodium faujasite supported in an aluminosilicate matrix, the unit mol ratio of the silica to alumina in the sodium faujasite being greater than 3.5 and less than 6.

4. The method of claim 3 in which the hydrated aluminum disilicate particles are heated at a temperature within the range from 1010° C. to 1050° C.

5. The method of claim 3 including the steps of shaping a composition consisting predominantly of the comminuted solid components to prepare particles of catalyst precursor, treating the particles of catalyst precursor, with aqueous ammonium salt solution so that the residual content of sodium oxide equivalent of the particles is less than about 2% of the anhydrous weight, and thermally treating the ammonium exchanged particles to evolve some ammonia to prepare cracking catalyst particles.

6. The method of claim 5 in which the shaping is by spray drying to prepare fluidizable microspheroids having a predominant particle diameter range from 15 to 150 microns, the composition subjected to spray drying being one having a predominant particle diameter less than one micron.

7. The method of claim 5 in which the composition from which catalyst precursor particles are shaped contains sodium silicate binder sufficient to provide in the cracking catalyst particles added silica constituting not less than 5% nor more than 20% silica, whereby the activity, selectivity, and stability of the cracking catalyst particles are superior to corresponding cracking catalyst particles containing more than 20% added silica and superior to corresponding cracking catalyst particles containing less than 5% added silica.

8. The method of making cracking catalyst particles which comprises the steps of: calcining a hydrated aluminum disilicate mineral of the group consisting of kaolin, halloysite, and mixtures thereof at a temperature within the range from about 965° C. to about 1095° C. for a period from about 0.1 to 10 hours to prepare calcined aluminum disilicate; cooling said calcined aluminum disilicate to ambient temperature; preparing a composition for ambient-temperature aging comprising the combination of from 4 to 6 parts by weight of said calcined aluminum disilicate per part of sodium hydroxide equivalent and from 4 to 10 parts of water per part of sodium hydroxide equivalent, any additional components not interfering with the ambient-temperature aging of said composition; maintaining said composition at a temperature within the range from 15° C. to 50° C. for from 5 hours to 5 days; altering the ambient-aged material by the addition of a modifier of the group consisting of water, an aqueous solution of sodium hydroxide, and a mixture of water and uncalcined kaolin; subjecting the thus-modified material to hot-aging at a temperature in the range from 55° C. to 120° C. for from about 5 hours to 5 days; subjecting the hot-aged composition to ammonium-ion-exchange to produce a composition consisting essentially of from 5% to 80% ammonium faujasite in an alumino-silicate matrix, the unit mol ratio of the silica to alumina in the ammonium faujasite being greater than 3.5 and less than 6; and thermally treating particles consisting perdominantly of said ammonium-exchanged composition to prepare cracking catalyst particles.

9. The method of claim 8 in which the ambient-aged material is modified by the addition of water.

10. The method of claim 8 in which the modifier is sprayed onto a falling curtain of the ambient-aged particles.

11. The method of claim 8 in which the ambient-aged material is subjected to a plurality of steps including the addition of a mixture of water and uncalcined kaolin as a modifier and the shaping into particles prior to hot-aging.

References Cited

UNITED STATES PATENTS

| | | | |
|---|---|---|---|
| 3,119,660 | 1/1964 | Howell et al. | 23—112 |
| 3,338,672 | 8/1967 | Haden et al. | 23—112 |
| 3,367,886 | 2/1968 | Haden et al. | 252—455 |
| 3,367,887 | 2/1968 | Haden et al. | 252—455 |
| 3,391,994 | 7/1968 | Haden et al. | 23—112 |

DANIEL E. WYMAN, Primary Examiner

C. F. DEES, Assistant Examiner

U.S. Cl. X.R.

23—112

PO-1050
(5/69)

UNITED STATES PATENT OFFICE
CERTIFICATE OF CORRECTION

Patent No. 3,515,682     (Page 1)     Dated June 2, 1970

Inventor(s) W. H. Flank et al

It is certified that error appears in the above-identified patent and that said Letters Patent are hereby corrected as shown below:

Column 2, line 21 - "magnetium" should read --magnesium--.

Column 9, line 14 - "364" should read --346--.

Column 9, line 43 - "aluminum" should read --alumina--.

Column 9, line 53 - "de-" should read --dissolved--.

Column 12, line 25 - "is" before the word "must" should read --it--.

Column 12, line 49 - "minerals" should read --mineral--.

Column 12, line 51 - "stream" should read --steam--.

Column 16, line 55 - "sufficient" should read --Sufficient--.

Column 20, line 60 - "pentant" should read --pentane--.

Column 21, line 64 - after "described" insert --as--.

Column 22, line 59 - "stirrnig" should read --stirring--.

Column 24, line 49 - "hydrovide" should read --hydroxide--.

Column 25, line 21 - "be" should be deleted.

Column 26, line 31 - "aging" should read --aged--.

PO-1050
(5/69)

UNITED STATES PATENT OFFICE
CERTIFICATE OF CORRECTION

Patent No. 3,515,682      (Page 2)   Dated June 2, 1970

Inventor(s) W. H. Flank et al

It is certified that error appears in the above-identified patent and that said Letters Patent are hereby corrected as shown below:

Column 26, line 66 - "an" appears two times.

Column 28, line 68 - "perdominantly" should read
--predominantly--.

SIGNED AND
SEALED
OCT 13 1970

(SEAL)
Attest:
Edward M. Fletcher, Jr.
Attesting Officer

WILLIAM E. SCHUYLER, JR.
Commissioner of Patents